United States Patent Office 3,517,006
Patented June 23, 1970

3,517,006
PROCESS FOR THE PURIFICATION OF 6-HALOGENOPURINE
Yasuo Fujimoto and Masao Naruse, Tokyo-to, Japan, assignors to Kyowa Hakko Kogyo K.K. (Kyowa Fermentation Industry Co., Ltd.), Tokyo-to, Japan, a corporation of Japan
No Drawing. Filed Jan. 19, 1966, Ser. No. 534,932
Claims priority, application Japan, Jan. 20, 1965, 40/2,535
Int. Cl. C07d 57/38
U.S. Cl. 260—254                                5 Claims

ABSTRACT OF THE DISCLOSURE

A process for recovering 6-halopurine from the reaction mixture produced by reacting hypoxanthine with a halogenating agent in the presence of a tertiary amine base by extraction with alcohol.

---

This invention relates to a process for the recovery of halopurines. More particularly this invention relates to a process for the recovery of 6-halopurines from a reaction mixture produced by halogenation of hypoxanthine with a halogenating agent in the presence of a base.

6-halopurines have already been used as intermediates in the preparation of various synthetic substances related to nucleic acids. Moreover, 6-halopurines have recently become important as medicaments.

In conventional processes for the preparation of 6-halopurines, hypoxanthine is halogenated with a halogenating agent (e.g. phosphorus oxychloride, phosphorus oxybromide, phosphorus pentabromide or phosphorus pentachloride) in the presence of a base (e.g. N,N-dimethylaniline, N,N-diethylaniline or pyridine), and the reaction product then purified by a suitable process for the isolation of the resulting 6-halopurine. Such purifying processes include the so-called extraction process utilizing organic solvents and the so-called salting-out process.

In one such process described in J. Am. Chem. Soc., 76 (1954), 6073, hypoxanthine is added first to phosphorus oxychloride and is then chlorinated by heating in the presence of N,N-dimethylaniline as catalyst. Excess of phosphorus oxychloride is distilled off under reduced pressure, and the resulting residue is decomposed by means of ice-cold water, and the organic product is then extracted several times with a large amount of ether. The ethereal solution is distilled to dryness to yield crude crystals of 6-chloropurine which are then recrystallized from hot water to yield pure 6-chloropurine. In another such process described in J. Appl. Chem., 84 (1962), 432, hypoxanthine is added to phosphorus oxychloride and is chlorinated by heating in the presence of N,N-dimethylaniline as catalyst. Excess of phosphorus oxychloride is distilled off from the reaction mixture, which is then decomposed by adding ice-cold water. The salting-out process [1] yields crude light-brown coloured 6-halopurine. This crude product is recrystallized from hot water to yield pure 6-halopurine. However, such conventional processes have various disadvantages, for example expensive material costs and serious danger of fire owing to the use of ether which is expensive, volatile, and inflammable. Ether has the further disadvantage of being a health hazard owing to its toxic nature. Moreover, such salting-out techniques in general are inefficient.

It is an object of the present invention to provide an improved process for the recovery of 6-halopurines from a reaction mixture produced by the halogenation of hypoxanthine with a halogenating agent in the presence of a base which process is simpler than those hitherto proposed and in general gives better yields.

According to the present invention, therefore we provide a process for the isolation of 6-halopurines from a reaction mixture produced by the halogenation of hypoxanthine with a halogenating agent (e.g. phosphorus oxychloride, phosphorus oxybromide, phosphorus pentachloride or phosphorus pentabromide) in the presence of a base (e.g. N,N-dimethylaniline, N,N-diethylaniline or pyridine) which comprises the steps of adding an alcohol to said reaction mixture to yield a precipitate containing crude 6-halopurine, which is then separated e.g. by filtration. After separation the precipitate may be washed with an alcohol or a mixture of alcohols to yield crude 6-halopurine. The crude product obtained can be recrystallized e.g., from water, to yield pure 6-halopurine. Alternatively, the said recation mixture is evaporated under reduced pressure to yield a residual solution, which is then treated analogously to give crude 6-halopurine.

However, the reaction mixture may be mixed without removal of the excess of halogenating agent, with one or more alcohols whereby the residual halogenating agent is decomposed and whereby a precipitate of 6-halopurine is obtained. The alcohol and said reaction mixture or residual solution may be mixed at a temperature below refluxing point thereof. It is preferred to add the alcohol for example at 5–60° C.

The resulting precipitate may be filtered off and washed with an alcohol to obtain a crude 6-halopurine having a purity of about 70–90%. The resulting crude 6-halopurine may if desired by recrystallized for example from hot water to obtain a purified product having high purity, generally more simply and and in higher yield from the starting materials than in the previously known processes, although the resulting crude 6-halopurine may be used as raw material for the preparation of various synthetic products such as 6-substituted purine derivatives.

A non-solvent for the 6-halopurine (other than alcohol) can be advantageously added to the said alcohol to improve the recovery procedure. Moreover, the excess of halogenating agent can be removed from the said reaction mixture for example by distillation whereby the necessary amount of the said alcohol and non-solvent can be much reduced. It is of course possible to recover the said alcohol and non-solvent to be used again. The non-solvent can also be added to the alcohol used for washing the precipitate.

Suitable alcohols capable of dissolving or decomposing the said halogenating agent are those having fewer than 10 carbon atoms and include methanol, ethanol, propanol and isopropanol, butanol and isomers thereof, pentanol and isomers thereof, hexanol and isomers thereof, cyclopentanol, cyclohexanol, ethylene glycol, propylene glycol, hexylene glycol, glycerol, benzyl alcohol and mixtures thereof.

Suitable non-solvents for the 6-halopurines include hydrocarbon solvents particularly aliphatic hydrocarbons, e.g. pentane and hexane; alicyclic hydrocarbons, e.g., cyclopentane and cyclohexane; aromatic hydrocarbons, e.g., benzene, toluene and xylene; petroleum hydrocarbons, e.g., petrol, petroleum ether, ligroin, gasoline, light oil, solvent naphtha and kerosene; chlorinated hydrocarbons, e.g., methylene chloride, chloroform, carbon tetrachloride, ethylene dichloride, ethylidene dichloride, trichloroethane, dichloroethylene, trichloroethylene, perchloroethylene, chlorobenzene, o-, m- and p-dichlorobenzene; and mixtures thereof.

The following non-limiting examples illustrate the present invention.

---

[1] Crude light brown 6 halopurine is precipitated by adding saturated NaCl solution to the resulting solution.

EXAMPLE 1

A homogeneous solution composed of 900 grams of phosphorus oxychloride and 150 grams of N,N-diethylaniline was added to 40.8 grams of hypoxanthine and the mixture was refluxed for about 20 minutes. Immediately after the reaction was discontinued, the excess of phosphorus oxychloride was distilled off under reduced pressure to yield a residue which was added to 80 grams of ice-cold methanol to decompose residual phosphorus oxychloride.

The obtained mixture was left at a temperature of 5° C. and the precipitate was then filtered off and washed with 50 ml. of a mixture of methanol and ethanol (1:1) to yield 48.0 grams of 6-chloropurine having a purity of 84.4%.

EXAMPLE 2

To a solution of 300 grams of phosphorus oxychloride and 150 grams of N,N-dimethylaniline was added 68 grams of hypoxanthine and the mixture was refluxed for about 20 minutes. Immediately after the reaction was discontinued, excess of phosphorus oxychloride was distilled off under reduced pressure to yield a residue to which was added 150 ml. of methanol at a temperature of 20–60° C. The mixture was left at room temperature after the addition of a mixture of 100 ml. of methanol and 400 ml. of ethanol to effect precipitation. The resulting precipitate was filtered off and washed with 100 ml. of ethanol to yield 55 grams of 6-chloropurine having a purity of 81.3%.

EXAMPLE 3

To a mixture of 1500 grams of phosphorus oxybromide and 180 grams of N,N-diethylaniline was added 40.8 grams of hypoxanthine and the mixture refluxed for about 20 minutes. Immediately after the reaction was discontinued, the excess of phosphorus oxybromide was distilled off under reduced pressure to yield a residue which was poured into 100 ml. of ice-cold methanol to effect precipitation.

The resulting precipitate was filtered off and washed with 50 ml. of a mixture of methanol and ethanol (1:1) to yield 62.8 grams of 6-bromopurine having a purity of 70.3%.

EXAMPLE 4

To a mixture of 150 grams of phosphorus oxychloride, 50 grams of phosphorus pentachloride, 120 grams of N,N-dimethylaniline, and 50 grams of pyridine, was added 40.8 grams of hypoxanthine and the mixture refluxed for about 15 minutes. After cooling to about 60° C., the reaction mixture was poured into 200 ml. of ice-cold methanol and ethanol (1:1). The resulting precipitate was filtered off and washed with 50 ml. of a methanol and ethanol mixture (1:1) to yield 49.7 grams of 6-chloropurine having a purity of 75.3%.

EXAMPLE 5

To a homogeneous solution composed of 300 grams of phosphorus oxychloride and 150 grams of N,N-dimethylaniline was added 68 grams of hypoxanthine and the mixture refluxed for 15 minutes. The reaction mixture was cooled and added dropwise to a mixture of 250 ml. of toluene and 250 ml. of isopropanol, and left at ambient temperature to yield a precipitate.

The precipitate was then filtered off and washed with 100 ml. of isopropanol to yield 61 grams of 6-chloropurine having a purity of 80.5%.

EXAMPLE 6

To a solution composed of 250 grams of phosphorus oxychloride and 150 grams of N,N-diethylaniline, was added 55 grams of hypoxanthine and the mixture refluxed for 20 minutes. After completion of the reaction, the reaction mixture was cooled to a temperature below 40° C. and then a mixed solution composed of 250 ml. of a mixture of isomers of trichloroethane, 100 ml. of ethanol, 100 ml. of propanol, and 100 ml. of butanol was added dropwise. The mixture was stirred for 2 hours at ambient temperature and the resulting precipitate was filtered off and washed with 100 ml. of ethanol to yield 58 grams of 6-chloropurine having a purity of 79.5%.

What we claim is:

1. A process for the recovery of 6-halopurine comprising reacting hypoxanthine with a halogenating agent selected from the group consisting of phosphorus oxychloride, phosphorous pentachloride, phosphorous oxybromide and phosphorous pentabromide, in the presence of a tertiary amine base, to produce a reaction mixture containing said 6-halopurine, adding to said reaction mixture an alcohol selected from the group consisting of methanol, ethanol, propanol, isopropanol, butanol and isomers thereof, pentanol and isomers thereof, hexanol and isomers thereof, cyclopentanol, cyclohexanol, ethylene glycol, propylene glycol, hexylene glycol, gycero, benzyl alcohol at a temperature of less than refluxing point to precipitate said 6-halopurine from said reaction mixture and separating said precipitated 6-halopurine from said reaction mixture.

2. The process of claim 1 wherein said base is selected from the group consisting of N, N-dimethylaniline; N, N-diethylaniline and pyridine.

3. The process of claim 1, wherein the alcohol is added to the reaction mixture at a temperature of from 5° to 60° C.

4. A process for the recovery of 6-halopurines comprising reacting hypoxanthine with a halogenating agent being selected from the group consisting of phosphorous oxychloride, phosphorous pentachloride, phosphorous oxybromide and phosphorus pentabromide in the presence of a tertiary amine base to produce a reaction mixture containing said 6-halopurine, adding to said reaction mixture a solvent mixture containing an alcohol being selected from the group consisting of methanol, ethanol, propanol, isopropanol, butanol and isomers thereof, pentanol and isomers thereof, hexanol and isomers thereof, cyclopentanol, cyclohexanol, ethylene glycol, propylene glycol, hexylene glycol, glycerol, benzyl alcohol and an organic solvent other than said alcohol which is incapable of decomposing or dissolving 6-halopurine and is selected from the group consisting of pentane, hexane, cyclopentane, cyclohexane, benzene, toluene, xylene, petrol, petroleum ether, ligroin, gasoline, light oil, solvent naphtha, kerosene, methylene chloride, chloroform, carbon tetrachloride, ethylene dichloride, ethylidene chloride, trichlorethane, dichloroethylene, trichloroethylene, perchloroethylene, chlorobenzene, o-, m- and p-dichlorobenzene and mixtures of the latter three thereof at a temperature of less than the refluxing point to precipitate said 6-halopurine from said reaction mixture and separating said precipitated 6-halopurine from said reaction mixture.

5. The process of claim 4 wherein said base is selected from the groups consisting of N,N-dimethylaniline; N,N-diethylaniline, and pyridine.

References Cited

UNITED STATES PATENTS

| | | | |
|---|---|---|---|
| 607,028 | 7/1898 | Fischer | 260—252 |
| 2,832,781 | 4/1958 | Hitchings et al. | 260—254 |

ALEX MAZEL, Primary Examiner

ANNE MARIE T. TIGHE, Assistant Examiner